(12) United States Patent  (10) Patent No.: US 6,679,198 B1
LaGarde  (45) Date of Patent: Jan. 20, 2004

(54) ANIMAL EXERCISE APPARATUS AND A METHOD FOR RESISTANCE TRAINING AN ANIMAL UTILIZING THE APPARATUS

(76) Inventor: Ted LaGarde, 16101 Stratford, Southfield, MI (US) 48075

( * ) Notice: Subject to any disclaimer, the term of this patent is extended or adjusted under 35 U.S.C. 154(b) by 0 days.

(21) Appl. No.: 10/271,679

(22) Filed: Oct. 15, 2002

(51) Int. Cl.[7] .......................... A01K 27/00; A62B 35/00
(52) U.S. Cl. ...................................... 119/792; 119/858
(58) Field of Search ............................... 119/792, 793, 119/856, 858

(56) References Cited

U.S. PATENT DOCUMENTS

| 2,826,172 | A | * | 3/1958 | Buckle et al. | 119/792 |
| 5,485,810 | A | * | 1/1996 | Sporn | 119/792 |
| 5,632,235 | A | * | 5/1997 | Larsen et al. | 119/856 |
| 5,887,772 | A | * | 3/1999 | Dooley | 119/858 |
| 5,896,831 | A | * | 4/1999 | Alpert | 119/856 |
| 6,314,915 | B1 | * | 11/2001 | Pope et al. | 119/792 |
| 6,564,754 | B1 | * | 5/2003 | Cohen | 119/856 |
| 6,571,745 | B2 | * | 6/2003 | Kerrigan | 119/858 |

* cited by examiner

*Primary Examiner*—Charles T. Jordan
*Assistant Examiner*—Elizabeth Shaw
(74) *Attorney, Agent, or Firm*—Law Offices of John Chupa and Associates, P.C.

(57) ABSTRACT

A method and an apparatus (10) which includes a plurality of selectively adjustable support straps (12, 18, 24, 30, 36, 42, 52) which may be selectively attached to an animal (100), a pair of weight pockets (48, 58) which allow substantially any desired weight (65) to be removably disposed within the weight pockets (48, 58) effective to provide an animal (100) with resistance training.

20 Claims, 3 Drawing Sheets

ANIMAL EXERCISE APPARATUS AND A METHOD FOR RESISTANCE TRAINING AN ANIMAL UTILIZING THE APPARATUS

FIELD OF THE INVENTION

The present invention generally relates to an animal exercise apparatus and a method for resistance training an animal utilizing the apparatus and, more particularly, to an animal exercise apparatus which distributes an amount of selectively removable weight around a harness in a substantially comfortable manner.

BACKGROUND OF THE INVENTION

Oftentimes it is desirable to provide an animal or household pet with a regimented exercise program or at the very least, some regular intervals of time in which the animal or pet may run or walk. Furthermore, if the desired animal or pet is experiencing some health problems or recovering from some health problems which may have been diagnosed by a Veterinarian or by simple observation, it is particularly desirable to allow the animal or pet to exercise or even "work-out." That is, some health conditions (e.g., heart problems, respiratory problems, muscle pains or fatigue, weight problems, and the like) which animals or pets may experience may be overcome by simply keeping the animal or pet in shape or physically fit.

Moreover, some animals or pets are bred to compete in physically demanding events. For example and without limitation, some greyhound dogs compete in such physically demanding races that it is not uncommon for one of the greyhound competitors to die from physical exhaustion after the race. In further example and without limitation, it is well known that horses compete in such grueling events as harness racing, jumping, short distance racing, and long distance racing. For each of these animal competitors, physical exercise and training is known to increase strength, speed, and stamina of the animals, thereby improving the level of competition that each of these animals can put forth.

Furthermore, some animals or pets are bred to compete in competitions or shows which judge muscle tone, bone structure, health, posture, weight, and overall beauty. In particular, it is well known that pure bred canines often compete in a plurality of competitive shows each year. These competitive shows require a canine to be in top physical condition in order to gain the competitive edge against all other canines competing in the same competitive show.

Lastly, it is well known that animal or pet owners take a certain pride in the way that their personal animal or pet looks, feels, and behaves. For example and without limitation, there are several animal or pet grooming boutiques, animal or pet training schools or academies, animal or pet walking or exercising day care centers, and the like.

Previous methods for exercising an animal or pet include, but are not limited to, taking an animal or pet out for a walk, allowing an animal or pet to practice or perform the physical activities in which they are to compete (e.g., canines or horses running around a track, horses jumping hurdles, horses pulling a cart or wagon, canines running an obstacle coarse, and the like), hiring a pet walker to walk or run an animal or pet, and in some circles of society, disposing a relatively heavy collar around a canine's neck in order to build muscles for the purposes of fighting other canines.

Each of these aforementioned methodologies do desirably exercise an animal or pet to a certain degree, however, each of these previous methodologies do suffer from some drawbacks. For example and without limitation, simply walking an animal or pet does not: increase the heart rate of the animal or pet to a sufficient level which is required for a typical aerobic exercise; provide the animal or pet with any added resistance which is required for strength training; or provide the animal or pet with a complete work-out which is required to burn fat and tone muscle.

In further example and without limitation, allowing an animal or pet to practice or perform the physical activities in which they are to compete does not: provide the animal or pet with any added resistance which is required for strength training; or provide the animal or pet with a complete work-out which is required to burn fat and tone muscle.

Furthermore, in example and without limitation, hiring a pet walker to walk or run an animal or pet not only requires a significant amount of monetary expenditure in order to hire a professional animal or pet walker, but does not: increase the heart rate of the animal or pet to a sufficient level which is required for a typical aerobic exercise; provide the animal or pet with any added resistance which is required for strength training; or provide the animal or pet with a complete work-out which is required to burn fat and tone muscle.

Lastly, in example and without limitation, disposing a relatively heavy collar around a canine's neck in order to build muscles for the purposes of fighting other canines not only dangerously burdens the canine's neck muscles and upper vertebrae by focusing weight on such a small area but does not: increase the heart rate of the canine to a sufficient level which is required for a typical aerobic exercise; provide the canine with any added resistance to other parts of the canine's body (i.e., other than the neck) which is required for strength training; or provide; the canine with a complete work-out which is required to burn fat and tone muscle.

There is therefore a need for an apparatus which provides an animal with added resistance or weight which is distributed along substantially the entire animal or pet in order to safely and comfortably provide strength training for the animal or pet in an efficient and cost effective manner. There is also a need for an apparatus which can be made to fit animals or pets of various sizes and shapes and selectively adjusts to fit differently sized animals or pets. There is also a need for a wearable apparatus which allows a user to attach the apparatus to an animal or pet, removably dispose various amounts of weight within sealable areas, and secure the wearable apparatus to the animal in a manner which substantially prevents chaffing, rubbing, or discomfort to the animal or pet, and which overcomes some or all of the previously delineated drawbacks of prior animal exercise methods.

SUMMARY OF THE INVENTION

A first non-limiting advantage of the present invention is that it provides an animal exercise apparatus which allows for the selectively removable attachment to an animal or pet and allows weights to be selectively removed in order to accommodate substantially any sized animal or pet in a manner which overcomes the previously delineated drawbacks of prior animal exercise methodologies.

A second non-limiting advantage of the invention is that it provides an animal exercise apparatus which allows for the selective adjustment of the apparatus to fit substantially any desired animal or pet.

A third non-limiting advantage of the present invention is that it provides a method for resistance training an animal in a manner which overcomes the previously delineated drawbacks.

A fourth non-limiting advantage of the present invention is that it provides an animal exercise apparatus comprising: a harness portion having at least one selectively adjustable support strap; a first weight pocket having a first selectively moveable fastening device which is movable from a first closed position to a second open position; at least one second weight pocket having a second selectively movable fastening device which is movable from a first open position to a second closed position, wherein the at least one second weight pocket is substantially identical to the first weight pocket; and a first vertical support strap and a second vertical support strap which are respectively coupled to a respective and unique portion of the harness portion, the first vertical support strap being coupled to the first weight pocket, and the second vertical support strap being coupled to the at least one second weight pocket.

A fifth non-limiting advantage of the present invention is that it provides a selectively adjustable and wearable animal exercise harness for use with various sized weights. Particularly, the apparatus comprises: a first selectively adjustable horizontal support strap having a first area, a second area, a middle portion, a female fastening device, and a male fastening device; a second selectively adjustable horizontal support strap having a first area, a second area, a third area, a fourth area, a female fastening device, and a male fastening device; a third selectively adjustable horizontal support strap having a first area, a second area, a female fastening device, and a male fastening device; a first selectively adjustable vertical support strap having a first end, a second end, and a middle area; a second selectively adjustable vertical support strap having a first end, a second end, and a middle portion; a first selectively adjustable diagonal support strap having a first end and a second end; a second selectively adjustable diagonal support strap having a first end and a second end; a first padded weight pocket; and a second padded weight pocket, wherein the first area of the first horizontal support strap is coupled to the first end of the first diagonal support strap and the first end of the second diagonal support strap is coupled to the second area of the first horizontal support strap, wherein the second end of the first diagonal support strap is coupled to the first area of the second horizontal support strap and the second end of the second diagonal support strap is coupled to the second area of the second horizontal support strap, wherein the first end of the vertical support strap is coupled to the third area of the second horizontal support strap and the fourth area of the second horizontal support strap is coupled to the first end of the second vertical support strap, wherein the second end of the first vertical support strap is coupled to the first area of the third horizontal support strap and the second area of the third horizontal support strap is coupled to the second end of the second vertical support strap, and wherein the first padded weight pocket is coupled to the middle portion of the first vertical support strap and the second padded weight pocket is coupled to the middle portion of the second vertical support strap.

A sixth non-limiting advantage of the present invention is that it provides a method for resistance training an animal while concomitantly distributing the resistance over the animal in a safe and efficient manner. Particularly, the method comprises the steps of: providing an animal harness having a first side, a second side, a plurality of adjustable support straps, and a first and second vertical support strap; providing a pair of substantially identical weights; providing a first and a second substantially identical weight pockets; coupling the first weight pocket to the first side of the harness and upon the first vertical support strap; coupling the second weight pocket to the second side of the harness and upon the second support strap; securely attaching the animal harness to a desired animal; and removably depositing one of the pair of substantially identical weights within the first weight pocket and removably depositing the remaining weight of the pair of substantially identical weights within the second weight pocket.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
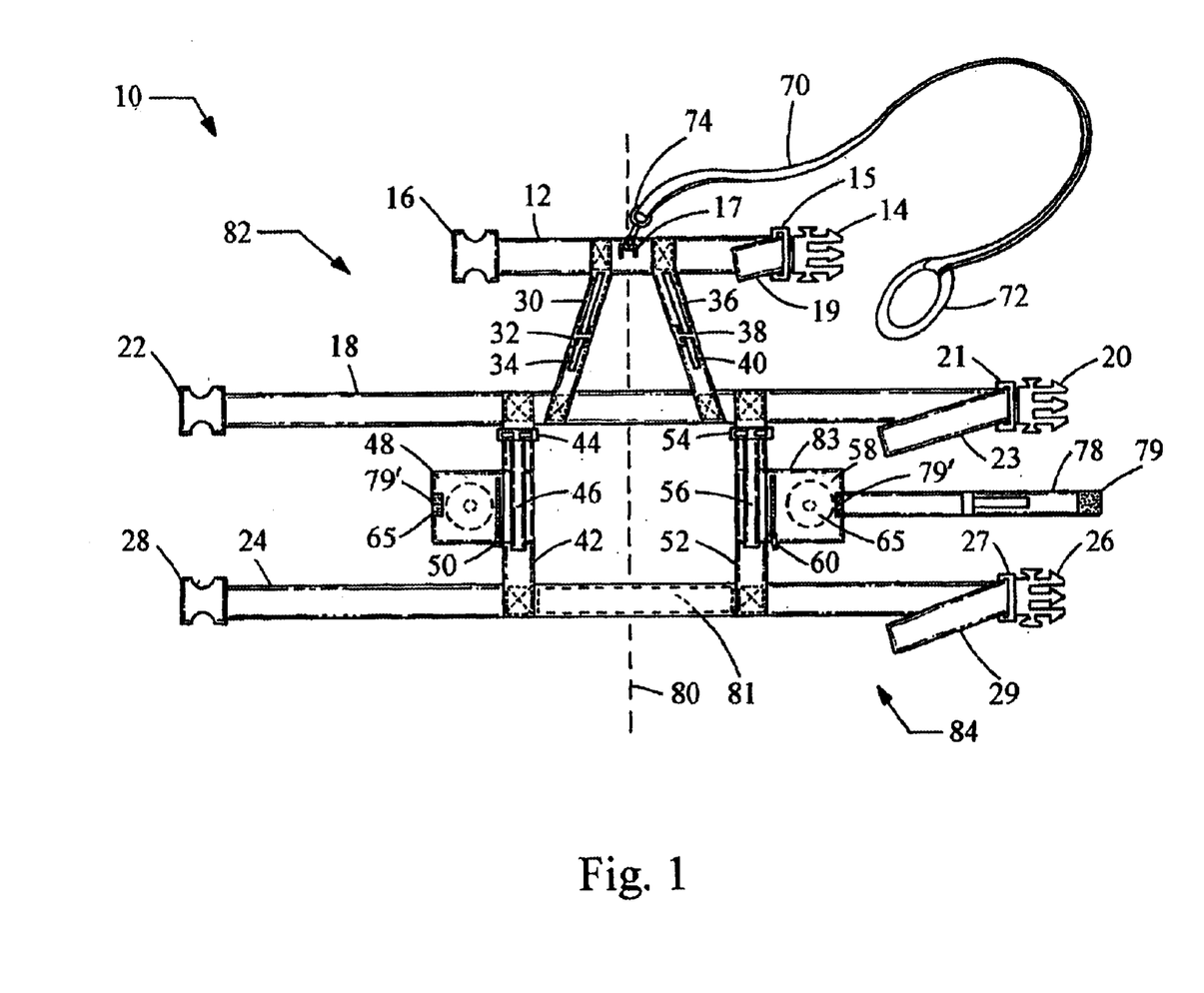
FIG. 1 is an unfastened top view of an animal exercise apparatus which is made in accordance with the teachings of the preferred embodiment of the invention.

Referring now to FIG. 1, there is shown an animal exercise apparatus. 10 which is made in accordance with the teachings of the preferred embodiment of the invention. As shown apparatus 10 includes a first selectively adjustable horizontal support strap 12, a second selectively adjustable horizontal support strap 18, and a third selectively adjustable horizontal support strap 24 which is substantially identical to the second selectively adjustable horizontal support strap 18. Particularly, each of the aforementioned first, second, and third selectively adjustable horizontal support straps 12, 18, and 24 each have a substantially identical and respective female fastening device 16, 22, 28, each of which receive a substantially identical and respective male fastening device 14, 20, 26. It should be understood that nothing in this description is meant to limit the fastening devices 14, 16, 20, 22, 26, 28 to a particular fastening device(s) or to the fastening devices which are shown in FIG. 1. Rather, as should be appreciated by one who is skilled in the relevant art, the fastening devices which are shown in FIG. 1 are merely for illustrative purposes only and substantially any desired conventional or commercially available fastening device(s) may be substituted in the place of the fastening devices 14, 16, 20, 22, 26, 28. For example and without limitation, fastening devices 14, 16, 20, 22, 26, 28 may be replaced by a conventional shoelace type fastening device, a conventional hook and pile type fastening device, a conventional button and button hole type fastening device, or the like.

Each respective male fastening device 14, 20, 26 of each respective horizontal support strap 12, 18, 24 further includes a first, a second, and a third respective and integrally formed length adjustment frame 15, 21, 27. That is, the male fastening device 19 includes a first and integrally formed length adjustment frame 15, the male fastening device 20 includes a second and integrally formed length adjustment frame 21, and the male fastening device 26 includes a third and integrally formed length adjustment frame 27. As should be appreciated to one who is skilled in the relevant art, each respective and integrally formed length adjustment frame 15, 21, 27 receives a portion of the first, the second, and the third horizontal support straps 12, 18, 24 respectively, wherein each respective received portion of the horizontal support straps 12, 18, 24 create a respective slack piece 19, 23, 29 respectively. Each respective slack piece 19, 23, 29 permit a user to pull or push the s lack piece 19, 23, 29 in order to selectively adjust the length of each of the respective horizontal support straps 12, 18, 24 (i.e., each of the respective slack pieces 19, 23, 29 act as a handle which allow a user to augment the size or length of the respective slack pieces 19, 23, 29 by pulling or pushing the slack pieces 19, 23, 29 towards or away from the integrally formed length adjustment frames 15, 21, 27).

Animal exercise apparatus 10 further includes a first selectively adjustable "vertical" support strap 42 (i.e., perpendicular to the first, second, and third horizontal support straps) and a second selectively adjustable vertical support strap 52. Particularly, each respective support strap 42, 52 is coupled to the second and third selectively adjustable horizontal support straps 18, 24 a nd equidistantly and opposingly spaced from center line 80 (i.e., center line 80 divides apparatus 10 substantially in half, thereby creating a left side 82 and a right side 84 of apparatus 10). As shown, the first vertical support strap 42 is coupled to the left side 82 of apparatus 10 and the second vertical support strap 52 is coupled to the opposing right side 84 of apparatus 10.

Vertical support straps 42, 52 each respectively include a weight pocket 48 and 58 respectively. More particularly, the first vertical support strap 42 includes a first weight pocket 48 which is selectively openable and closeable by the use of fastening device 50. As shown in FIG. 1, fastening device 50 comprises a conventional zipper type fastening device. However, as should be appreciated by one who is skilled in the relevant art, nothing in this description is meant to limit the fastening device 50 to a conventional zipper type fastening device. Rather, the fastening device 50 which is depicted in FIG. 1 is merely for illustrative purposes only and a plurality of different and conventional fastening devices are equally as applicable to pocket 48 as the zipper 50. For example and without limitation, fastening device 50 may be replaced by substantially any desired conventional and/or commercially available fastening device (e.g., fastening devices such as button and button hole type fastening devices, hook and pile type fastening devices, shoelace type fastening devices, and the like).

The second selectively adjustable vertical support strap 52, as mentioned above, further includes a second weight pocket 58. Particularly, the second weight pocket 58 is substantially identical to the previously described first weight pocket 48 of the first selectively adjustable vertical support strap 42. That is, the second weight pocket 58 is selectively openable and closable by the use of fastening device 60. As shown in FIG. 1, fastening device 60 comprises a conventional zipper type fastening device. However, as should be appreciated to one who is skilled in the relevant art, nothing in this description is meant to limit the fastening device 60 to a conventional zipper type fastening device. Rather, the fastening device 60 which is depicted in FIG. 1 is merely for illustrative purposes only and a plurality of different and conventional fastening devices are equally as applicable to pocket 58 as the zipper 60. For example and without limitation, fastening device 60 may be replaced by substantially any desired conventional and/or commercially available fastening device (e.g., fastening devices such as button and button hole type fastening devices, hook and pile type fastening devices, shoelace type fastening devices, or the like).

Each of the respective first and second weight pockets 48, 58 are adapted to operatively and removably contain or hold at least one weight 65. In this manner, substantially any desired size weight, such as weights 65 may be removably placed within each respective weight pocket 48, 58 and secured within each respective weight pocket 48, 58, by the respective use of fastening devices 50, 60.

The first selectively adjustable vertical support strap 42 further includes a length adjustment frame 44. Length adjustment frame 44 operatively receives support strap 42 in a conventional manner and permits a user to selectively adjust the length of the vertical support strap 42 by grasping the length adjustment frame 44 and pulling or pushing the slack piece 46. In this manner, vertical support strap 42 may be selectively adjusted to substantially any desired length.

The second selectively adjustable vertical support strap 52 further includes a length adjustment frame 54. Length adjustment frame 54 operatively receives support strap 52 in a conventional manner and permits a user to selectively adjust the length of the vertical support strap 52 by grasping the length adjustment frame 54 and pulling or pushing the slack piece 56. In this manner, vertical support strap 52 may be selectively adjusted to substantially any desired length.

Animal exercise apparatus 10 further includes a first selectively adjustable offset or diagonal support strap 30 and a second selectively adjustable offset or diagonal support strap 36. Particularly, the first diagonal support strap 30 is coupled to the first horizontal support strap 12 and to the second horizontal support strap 18. More particularly, as will be discussed further below, the coupling of the first horizontal support strap 12 to the second horizontal support strap 18 by the use of the first selectively adjustable diagonal support strap 30, allows the distance between the first and second horizontal support straps 12, 18 to be selectively adjusted..

The first selectively adjustable diagonal support strap 30 includes a length adjustment frame 32 which receives support strap 30 in a conventional manner, thereby creating a slack piece 34 which allows a user to push or pull the slack piece 34 towards or away from the length adjustment frame 32. In this manner, a user of the animal exercise apparatus 10 may selectively adjust the spacing between the first horizontal support strap 12 and the second horizontal support strap 18.

The second selectively adjustable diagonal support strap 36 includes a length adjustment frame 38 which receives support strap 36 in a conventional manner, thereby creating a slack piece 40 which allows a user to push or pull the slack piece 40 towards or away from the length adjustment frame 38. In this manner, a user of the animal exercise apparatus 10 may selectively adjust the spacing between the first horizontal support strap 12 and the second horizontal support strap 18.

In one non limiting embodiment, the first horizontal support strap 12 further includes a substantially "U" shaped leash attachment loop 17. Particularly, leash attachment loop 17 is coupled to the first horizontal support strap 12 between the first and second diagonal support straps 30, 36 (i.e., the leash attachment loop 17 is coupled to the first horizontal support strap 12 in a position which substantially divides the horizontal support strap 12 into two halves). Moreover, in yet another non-limiting embodiment, animal exercise apparatus 10 further includes a conventional animal leash 70. Particularly, leash 70 includes a conventional hand hold loop 72 and a conventional karabiner type fastening device 74 which cooperates with the leash attachment loop 17 to couple the leash 70 to the first horizontal support strap 12. It should be appreciated that nothing in this description is meant to limit the conventional leash 70 to any particular design or configuration. Rather, may different designs or configurations of conventional leashes may be substituted in the place of conventional leash 70. For example and without limitation, conventional leash 70 may be replaced by a mechanically enabled retractable and expandable type leash, a chain link type leash, a length of rope, a bungee cord, or substantially any desired type of animal leash.

In yet another non-limiting embodiment, every portion of animal exercise apparatus 10 which comes in direct contact with the animal to which animal exercise apparatus 10 is fastened to may further be padded or have a sleeve of padding 81 surrounding that portion. That is, each of the first, second, and third horizontal support straps 12, 18, 24 may be padded to provide a greater degree of comfort to the animal which wears apparatus 10. Furthermore, each respective vertical support strap 42, 52 and each respective diagonal support strap 30, 36 may also be padded to provide a greater degree of comfort to the animal which wears apparatus 10. Lastly, each respective weight pocket 48, 58 may also be padded in order to prevent the weights 65 contained within the weight pockets 48, 58 from bouncing, rubbing, or otherwise impacting the animal which wears the apparatus 10.

In yet another non-limiting embodiment, each respective weight pocket 48, 58 and each support strap 12, 18, 24, 30, 36, 42, and 52 may further include a waterproof material, such as a flexible plastic liner 83 which substantially prevents any moisture from damaging apparatus 10. In this manner, animal exercise apparatus 10 may be used in substantially any weather condition.

Figure 2:
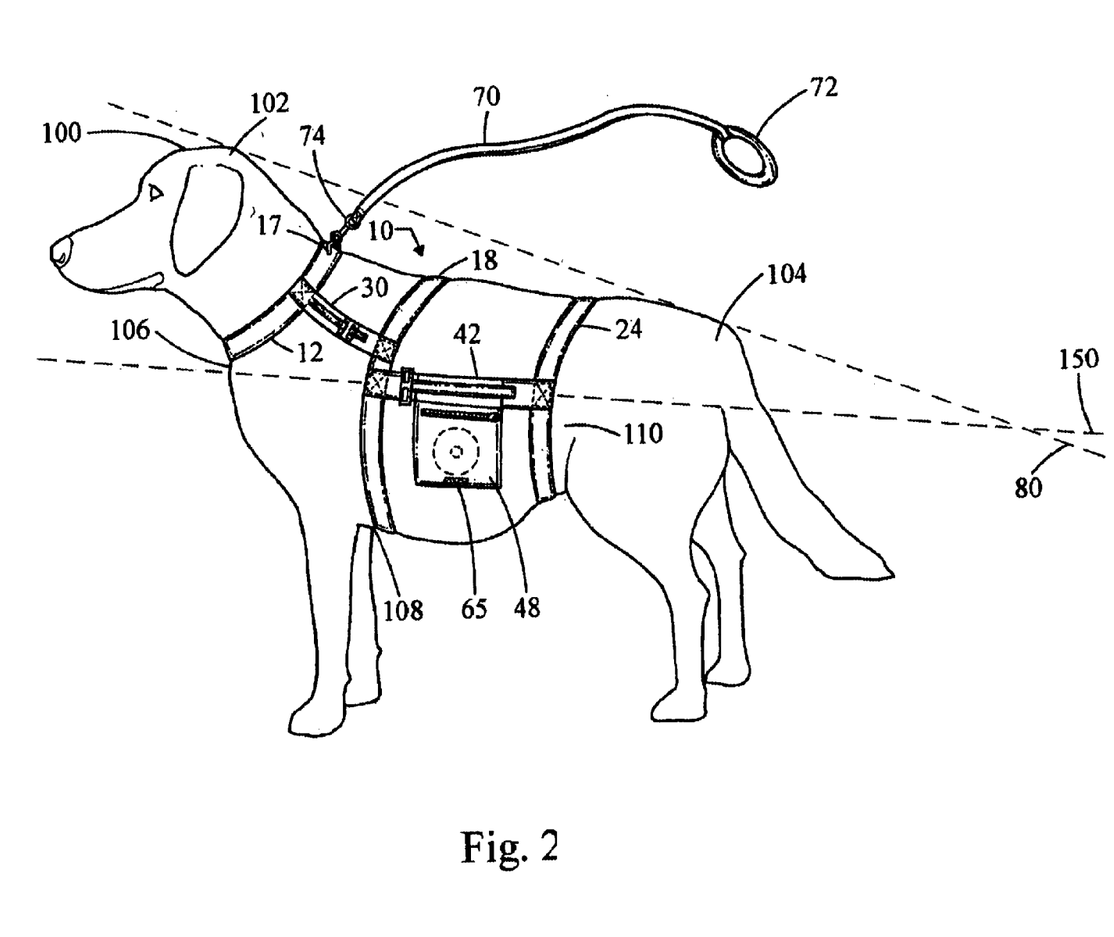
FIG. 2 is a perspective view of the animal exercise apparatus which is shown in FIG. 1 and which is attached to a canine.

Referring now to FIG. 2, there is shown the animal exercise apparatus 10 operatively fastened to a canine 100. Particularly, canine 100 has a first anterior end 102, a second posterior end 104, a neck area 106, an "arm-pit" area 108, and a mid-section or waist area 110. At the outset, it should be understood that nothing in this description is meant to limit the size, shape, breed, or general weight of the canine 100 to any particular size, shape, breed, or general weight. Rather, the canine 100 which is depicted in FIG. 2 is merely for illustrative purposes only and canine exercise apparatus 10 may be adjusted or sized to accommodate substantially any size, shape, breed, or weight of canine 100. Furthermore, it should be appreciated that the apparatus 10 is not limited to only canines. Rather, as should be appreciated by one who is skilled in the relevant art, apparatus 10 may be produced to accommodate substantially large animals, such as and without limitation a horse, or substantially small animals, such as and without limitation a feline.

As shown in FIG. 2, the first selectively adjustable horizontal support strap 12 is adapted to be fastened around an animal's neck area 106. The second selectively adjustable horizontal support strap 18 is adapted to be fastened around the animal's chest and at a position which partially covers the animal's arm-pit area 108. The third selectively adjustable horizontal support strap 24 is adapted to be fastened around the animal's waist area 110. Moreover, the first and second selectively adjustable diagonal support straps 30, 36 are adapted to run along the shoulder and lateral muscles of the animal 100, effective to prevent any portion of the added weight 65 from resting or otherwise be supported by a "soft" portion or delicate portion of the animal's body. The first and second selectively adjustable vertical support straps 42, 52 are designed to be positioned substantially in the center .of the animal's mid-section or body. That is, each respective horizontal support strap 42, 52 are each designed to lay along a unique one side of the animal and at a position which is substantially parallel to mid-line 150. It should be appreciated that mid-line 150 represents a horizontal line passing through the approximate vertical center of gravity of animal 100. In this manner, the weight 65 contained in each respective weight pocket. 48, 58 will be substantially distributed along the entire apparatus 10 and, therefore will not rest upon any one particular portion of the animal. That is, since each of the horizontal support straps 42, 52 are located on a unique side of the animal and are located at or below the mid-line 150 of the animal 100, little to no weight 65 will be resting directly upon the animal 100.

In one non-limiting embodiment of the invention, apparatus 10 may further include a selectively adjustable support strap 78 which may include a respective attachment device 79 upon each respective end of the support strap 78. In this manner, each of the weight pockets 48, 58, may be further secured around an animal 100, effective to substantially prevent the weight pockets 48, 58, from moving, bouncing, or swaying while an animal is wearing the apparatus 10. Furthermore, each weight pocket 48, 58, may include a fastening device 79 which cooperates with the fastening devices 79 of the support strap 78. In this manner, the support strap 78 may include such conventional fastening devices as hook and pile, button and button hole, snaps,.or the like, which will permit convenient attachment and removal of the support strap 78 around the animal.

Figure 3:
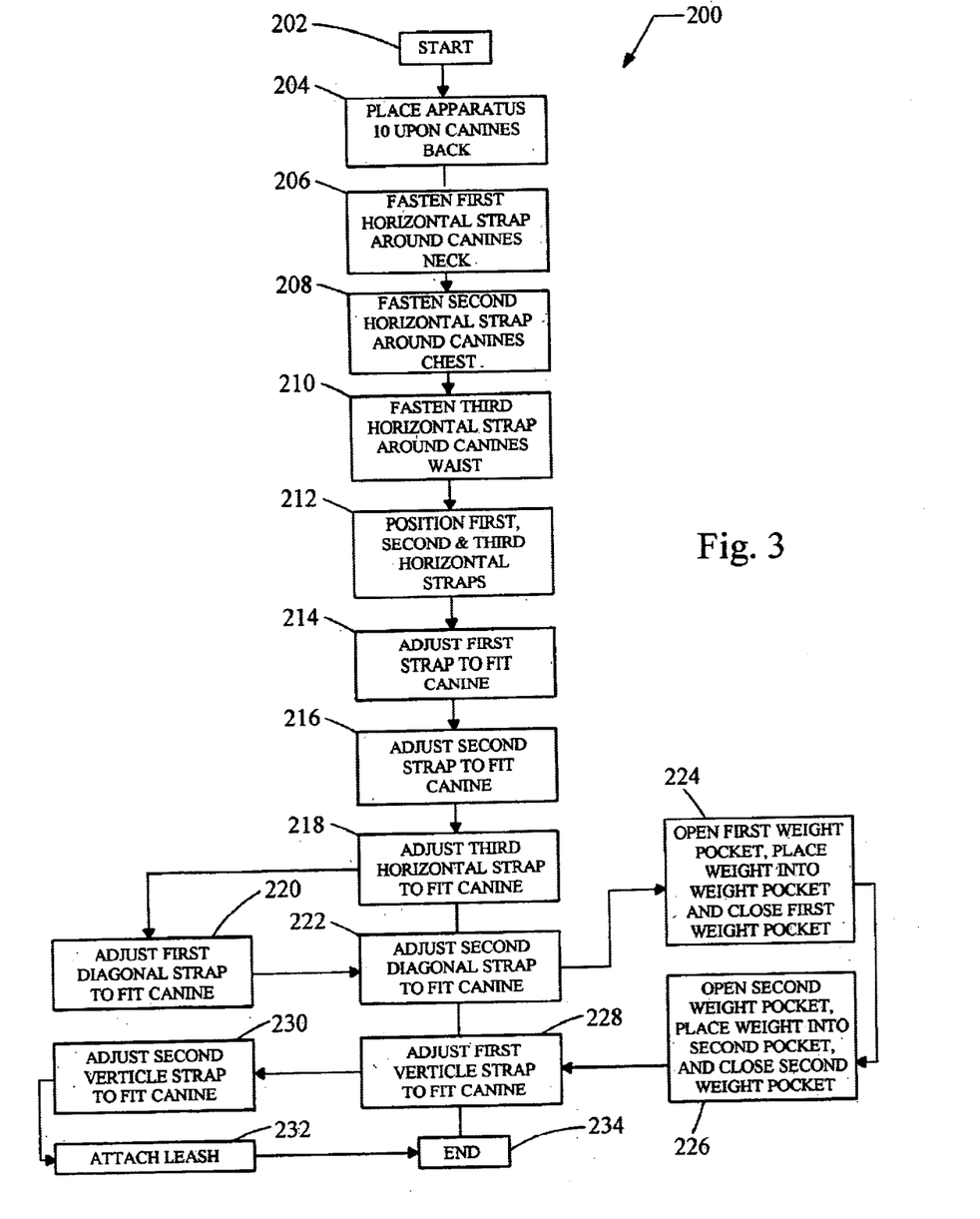
FIG. 3 is a flowchart which outlines one non-limiting methodology for attaching the animal exercise apparatus to an animal.

Referring now to FIG. 3, there is shown one non-limiting methodology 200 for attaching the animal exercise apparatus 10 to an animal, such as the canine 100. As shown, methodology 200 begins with step 202. Step 204 follows step 202 and, in this step 204, a user (i.e., a person desiring to exercise the animal 100) of the animal exercise apparatus 10 places the apparatus 10 upon the canine's back, such that the first horizontal support strap 12 is located in close proximity to the canine's neck area 106, the second horizontal support strap 18 is located in close proximity to the canine's chest/arm pit area 108 the third horizontal support strap 24 is located in close proximity to the canine's waist area 110, and each of the vertical support straps 42, 52 are positioned upon the canine's back and equidistantly spaced from center line 80. It should be appreciated that the areas 106 and 110 are desired "target areas" or areas which may receive the straps 18, 24 respectively, are different in every animal, and that these target areas 106 and 110 may be located on each desired animal and the straps 18, 24 may be selectively adjusted to fit each respectively different sized animal's target areas.

Step 206 follows step 204 and, in this step 206, the user fastens the first selectively adjustable horizontal support strap 12 around the canine's neck area 106 by clasping or connecting male fastening device 14 within female fastening device 16. Step 208 follows step 206 and, in this step 208, the user fastens the second selectively adjustable horizontal support strap 18 around the canine's chest by clasping or connecting male fastening device 20 within female fastening device 22. Step 210 follows step 208 and, in this step 210, the user fastens the third selectively adjustable horizontal support strap around the canine's waist 110 by clasping or connecting male fastening device 26 within female fastening device 28.

Step 212 follows step 210 and, in this step 212 the user repositions the recently fastened straps 12, 18, 24 to be in close proximity to the previously discussed "target-areas" (e.g., target areas 106 and 110). Step 214 follows step 212 and, in this step 214, the user adjusts the first horizontal strap 12 to fit the canine's neck area 106 by grasping the slack piece 19 and pulling the slack piece 19 away from the integrally formed length adjustment frame 15 of male fastening device 14. Step 216 follows step 214 and, in this step 216, the user adjusts the second horizontal strap 18 to fit around the canine's chest and substantially cover the canine's arm pit area 108 by grasping the slack piece 23 and pulling the slack piece 23 away from the integrally formed length adjustment frame 21 of male fastening device 20. Step 218 follows step 216 and, in this step 218, the user adjusts the third horizontal strap 24 to fit around the canine's waist area 110 by grasping the slack piece 29 and pulling the slack piece 29 away from the integrally formed length adjustment frame 27 of male fastening device 26.

Step 220 follows step 218 and, in this step 220, the user adjusts the first selectively adjustable diagonal support strap 30 by grasping the slack piece 34 and either pulling the slack piece 34 in a direction away from or pushing the slack piece 34 in a direction towards the length adjustment frame 32, effective to ensure that the first and second horizontal support straps 12, 18 are fixed in the proper position. Step 222 follows step 220 and, in this step 222, the user will adjust the second selectively adjustable diagonal support strap 36 by grasping the slack piece 40 and either pulling the slack piece 40 in a direction away from or pushing the slack piece 40 in a direction towards the length adjustment frame 38, effective to ensure that the first and second horizontal support straps 12, 18 are fixed in the proper position.

Step 224 follows step 222 and, in this step 224, the user opens the first weight pocket 48 by grasping the conventional zipper 50 and unzipping the first weight pocket 48 to an open position. The user then will place a desired weight 65 within the first weight pocket 48 and secure the weight 65 within the weight pocket 48 by zipping the fastening device 50 back to a closed position. Step 226 follows step 224 and, in this step 226, the user opens the second weight pocket 58 by grasping the conventional zipper 60 and unzipping the second weight pocket 58 to an open position. The user then will place a desired weight 65 within the second weight pocket 58 and secure the weight 65 within the weight pocket 58 by zipping the fastening device 60 back to a closed position.

Step 228 follows step 226 and, in this step 228, the user adjusts the first selectively adjustable vertical support strap 42 by grasping the slack piece 46 and pulling the slack piece 46 in a direction away from the length adjustment frame 44, thereby removing any slack in the vertical support strap 42 which may have been created by the weight 65 which was placed within the first weight pocket 48. Step 230 follows step 228 and, in this step 230, the user adjusts the second selectively adjustable vertical support strap 52 by grasping the slack piece 56 and pulling the slack piece 56 in a direction away from the length adjustment frame 54, thereby removing any slack in the vertical support strap 52 which may have been created by the weight 65 which was placed within the second weight pocket 58.

Step 232 follows step 230 and, in this step 232 the user selectively and removably attaches the conventional leash 70 to the leash attachment portion 17 by use of the karabiner type fastening device 74. Step 234 follows step 232 and, in this step 234, the methodology 200 is completed.

It should be understood that this invention is not limited to the exact construction or embodiments listed and described, but that various changes may be made without departing from the spirit and scope of the invention. For example and without limitation, each respective weight pocket 48, 58 may be replaced with a weighted support strap (not shown), each respective weight pocket 48, 58 may be geometrically shaped differently from the square shape depicted in FIGS. 1 and 2, or methodology 200 may employ more or less steps and be conducted in a substantially different order from that which is described above and which is depicted in FIG. 3.

What is claimed is:

1. An animal exercise apparatus comprising:
   a harness portion having at least one selectively adjustable support strap;
   a first weight pocket having a first selectively moveable fastening device which is movable from a first closed position to a second open position;
   at least one second weight pocket having a second selectively movable fastening device which is movable from a first open position to a second closed position, wherein said at least one second weight pocket is substantially identical to said first weight pocket; and
   a first vertical support strap and a second vertical support strap which are respectively coupled to a respective and unique portion of said harness portion, said first vertical support strap being coupled to said first weight pocket, and said second vertical support strap being coupled to said at least a second weight pocket.

2. The apparatus of claim 1 wherein said harness portion further comprises a first selectively adjustable horizontal support strap, a second selectively adjustable horizontal support strap, and at least one third selectively adjustable horizontal support strap.

3. The apparatus of claim 2 wherein said first selectively adjustable horizontal support strap, said second selectively adjustable horizontal support strap, and said at least one third selectively adjustable horizontal support strap each further comprising a unique female fastening device and a unique male fastening device, each of said unique female fastening devices receiving a unique one of said male fastening devices, effective to removably attach said harness portion to an animal.

4. The apparatus of claim 3 wherein each of said unique male fastening devices further include an integrally formed length adjustment frame, each of said integrally formed length adjustment frames receiving a respective portion of said harness, effective to allow said animal exercise apparatus to be selectively adjustable.

5. The apparatus of claim 2 wherein said first vertical support strap and said second vertical support strap each further comprise a first end, a second end, and a middle portion, wherein said first end of said first support strap is coupled to a first area of said second horizontal support strap and said second end of said first vertical strap is coupled to a first area of said third horizontal strap, wherein said first end of said second vertical support strap is coupled to a second area of said second horizontal support strap and said second end of said second horizontal support strap is coupled to a second area of said third horizontal support strap, and wherein each of said middle portions further include a length adjustment frame.

6. The apparatus of claim 5 wherein said first vertical support strap and said second vertical support strap are equidistantly and opposingly spaced from a middle of an animal's back.

7. The apparatus of claim 5 wherein said harness portion further includes a first selectively adjustable diagonal support strap and a second selectively adjustable diagonal support strap, wherein said first and said second selectively adjustable diagonal support straps each further include a length adjustment frame, a first end, and a second end.

8. The apparatus of claim 7 wherein said first end of said first selectively adjustable diagonal support strap is coupled to a first area of said first horizontal support strap and said second end of said first selectively adjustable diagonal support strap is coupled to a third area of said second horizontal support strap and in close proximity to said first end of said first vertical support strap, wherein said first end of said second selectively adjustable diagonal support strap is coupled to a second area of said first horizontal support strap and said second end of said second diagonal support strap is coupled to a fourth area of said third horizontal support strap and in close proximity to said first end of said second vertical support strap.

9. The apparatus of claim 8 wherein said length adjustment frames of said first and said second diagonal support straps each respectively receive a portion of a respective one of said diagonal support straps, effective to permit said first and said second diagonal support straps to be selectively adjusted to substantially any desired length.

10. The apparatus of claim 9 further including:
    a leash attachment loop which is coupled between said first and said second areas of said first horizontal support strap, effective to allow a leash to be removable attached to said animal exercise apparatus; and
    a padded material which is coupled to each of said first, second, and third horizontal support straps, each of said first and second vertical support straps, each of said first and second diagonal support straps, and each of said first and second weight pockets, effective to protect an animal from chaffing and bruising.

11. A selectively adjustable and wearable animal exercise harness for use with various sized weights, said apparatus comprising:
    a first selectively adjustable horizontal support strap having a first area, a second area, a middle portion, a female fastening device, and a male fastening device;
    a second selectively adjustable horizontal support strap having a first area, a second area, a third area, a fourth area, a female fastening device, and a male fastening device;
    a third selectively adjustable horizontal support strap having a first area, a second area, a female fastening device, and a male fastening device;
    a first selectively adjustable vertical support strap having a first end, a second end, and a middle area;
    a second selectively adjustable vertical support strap having a first end, a second end, and a middle portion;
    a first selectively adjustable diagonal support strap having a first end and a second end;
    a second selectively adjustable diagonal support strap having a first end and a second end;
    a first padded weight pocket; and
    a second padded weight pocket, wherein said first area of said first horizontal support strap is coupled to said first end of said first diagonal support strap and said first end of said second diagonal support strap is coupled to said second area of said first horizontal support strap, wherein said second end of said first diagonal support strap is coupled to said first area of said second horizontal support strap and said second end of said second diagonal support strap is coupled to said second area of said second horizontal support strap, wherein said first end of said vertical support strap is coupled to said third area of said second horizontal support strap and said fourth area of said second horizontal support strap is coupled to said first end of said second vertical support strap, wherein said second end of said first vertical support strap is coupled to said first area of said third horizontal support strap and said second area of said third horizontal support strap is coupled to said second end of said second vertical support strap, and wherein said first padded weight pocket is coupled to said middle portion of said first vertical support strap and said second padded weight pocket is coupled to said middle portion of said second vertical support strap.

12. The selectively adjustable and wearable animal exercise harness of claim 11 wherein said first and said second padded weight pockets each further include a selectively movable fastening device which moves from a first position to a second open position, thereby allowing said first and said second padded weight pockets to be opened and closed, effective to permit said various sized weights to be removably disposed and contained within said first and said second padded weight pockets.

13. The selectively adjustable and wearable animal exercise harness of claim 12 wherein said selectively movable fastening device of said first and said second padded weight pockets comprise a zipper.

14. The selectively adjustable and wearable animal exercise harness of claim 13 wherein said first and said second padded weight pockets each further include a liner which is disposed within each of said padded weight pockets, effective to protect said weight pockets from moisture damage.

15. The selectively adjustable and wearable animal exercise harness of claim 11 wherein said middle portion of said first horizontal support strap further includes a leash attachment portion which allows a user to selectively and removably attach a leash to said selectively adjustable and wearable animal exercise harness.

16. The selectively adjustable and wearable animal exercise harness of claim 11 wherein said first vertical support strap, said second vertical support strap, said first diagonal support strap, and said second diagonal support strap each further include a length adjustment frame, wherein each of said respective length adjustment frames receive a respective portion of the support strap to which it is attached to, effective to allow each of said support straps to be selectively adjustable.

17. The selectively adjustable and wearable animal exercise harness of claim 11 wherein each of said male fastening devices of said first, said second, and said third horizontal support straps further include an integrally formed length adjustment frame, each of said integrally formed length adjustment frames receiving a respective portion of the horizontal support strap to which each respective male fastening device is attached, effective to allow said selectively adjustable and wearable animal exercise harness to be fitted to substantially any desired animal.

18. The selectively adjustable and wearable animal exercise harness of claim 11 wherein each of said support straps further comprise a top side and a bottom side, said harness further including an amount of padded material which is coupled to said bottom side of each of said support straps.

19. A method for resistance training an animal while concomitantly distributing said resistance over the animal in a safe and efficient manner, said method comprising the steps of:
    providing an animal harness having a first side, a second side, a plurality of adjustable support straps, and a first and second vertical support strap;
    providing a pair of substantially identical weights;
    providing first and a second substantially identical weight pockets;

coupling said first weight pocket to said first side of said harness and upon said first vertical support strap;

coupling said second weight pocket to said second side of said harness and upon said second vertical support strap;

securely attaching said animal harness to a desired animal; and removably depositing one of said pair of substantially identical weights within said first weight pocket and removably depositing the remaining weight of said pair of substantially identical weights within said second weight pocket.

20. The method of claim 19 further comprising the steps of:

coupling said plurality of selectively adjustable support straps to said desired animal;

adjusting said plurality of said selectively adjustable support straps to fit said desired animal;

coupling a leash to said harness; and causing said desired animal to walk and run, thereby resistance training said animal.

\* \* \* \* \*